United States Patent [19]

Anderson et al.

[11] Patent Number: 4,838,206
[45] Date of Patent: * Jun. 13, 1989

[54] COMBINATION COLLAR AND MUZZLE HUMANE TRAINING AID

[75] Inventors: Robert K. Anderson, Roseville; Ruth E. Foster, Minneapolis; Jeffrey A. Levine, Bloomington, all of Minn.

[73] Assignee: Regents of the University of Minnesota, Minneapolis, Minn.

[ * ] Notice: The portion of the term of this patent subsequent to Nov. 11, 2003 has been disclaimed.

[21] Appl. No.: 169,294

[22] Filed: Mar. 17, 1988

Related U.S. Application Data

[63] Continuation of Ser. No. 922,156, Oct. 23, 1986, Pat. No. 4,741,288, which is a continuation-in-part of Ser. No. 719,697, Apr. 4, 1985, Pat. No. 4,621,591.

[51] Int. Cl.⁴ ............................................. A01K 25/00
[52] U.S. Cl. ........................................ 119/130; 54/24; 54/15
[58] Field of Search .................... 54/24, 15; 119/106, 119/130

[56] References Cited

U.S. PATENT DOCUMENTS

| | | | |
|---|---|---|---|
| 206,586 | 7/1878 | Leland . | |
| 416,227 | 3/1889 | Lally | 54/24 |
| 417,864 | 12/1889 | Gleisser | 54/24 |
| 422,626 | 3/1890 | Pruyne . | |
| 462,743 | 11/1891 | Sisson . | |
| 660,494 | 10/1900 | Evans | 54/24 |
| 2,499,868 | 3/1950 | Kinskie | 119/130 |
| 2,602,421 | 7/1952 | Barker | 119/130 |
| 2,625,780 | 1/1953 | Flatt | 54/6 |
| 2,672,846 | 3/1954 | Maynard | 119/130 |
| 2,932,930 | 4/1960 | Ray | 54/24 |
| 2,940,425 | 6/1960 | Dykens | 119/130 |
| 3,949,538 | 4/1976 | Woodruff | 54/24 |
| 4,337,610 | 7/1982 | Taylor | 54/24 |
| 4,369,615 | 1/1983 | Bloodworth | 54/24 |
| 4,472,925 | 9/1984 | Woodruff | 54/24 |
| 4,483,275 | 11/1984 | DeGroot | 119/130 |
| 4,566,255 | 1/1986 | De Groot | 54/24 |
| 4,621,591 | 11/1986 | Anderson et al. | 54/15 X |
| 4,741,288 | 5/1988 | Anderson et al. | 119/130 |

FOREIGN PATENT DOCUMENTS

72269 8/1916 Austria .
117942 12/1925 Switzerland .

Primary Examiner—Gene Mancene
Assistant Examiner—R. Thomas Price
Attorney, Agent, or Firm—Kinney & Lange

[57] ABSTRACT

A combination collar and muzzle is used as a humane method of restraining, controlling, and achieving obedient behavior of animals, dogs in particular. A collar member or loop encircles the neck immediately behind the ears, and a second muzzle loop encircles the upper and lower jaws of the animal to form a type of a figure eight combination collar and muzzle. The two loops are coupled together with a ring behind the jaw. The muzzle loop is adjustable in length. An optional adjustable keeper strap is connected between the collar loop and the muzzle loop to retain the muzzle loop from being pawed off.

8 Claims, 6 Drawing Sheets

COMBINATION COLLAR AND MUZZLE HUMANE TRAINING AID

CROSS-REFERENCE TO RELATED APPLICATIONS

This application is a continuation of application Ser. No. 922,156, filed Oct. 23, 1986, now U.S. Pat. No. 4,741,288, which, in turn, is a continuation-in-part of our co-pending U.S. patent application Ser. No. 719,697, filed Apr. 4, 1985, now U.S. Pat. No. 4,621,591.

BACKGROUND OF THE INVENTION

1. Field of the Invention.

The present invention relates to training aids used for controlling and achieving obedient behavior of dogs in particular.

2. Description of the Prior Art.

In the prior art various types of muzzles and collars have been used in attempts to achieve dog control, including a metal choke chain collar which encircles the neck and tightens down to tend to choke the dog as control pressure is applied through a leash. This choke collar applies pressure to the skin and muscles of the neck as well as to the larynx and trachea producing pain and interfering with the breathing. Severe injury can result, particularly to the trachea and larnyx and the collar may slip down toward the body of the dog to a position on the neck where the collar is not in contact with the muscles and nerves most suitable for controlling animal behavior.

Additionally, there are prong collars that have metal prongs or points that press against the skin of the neck producing pain at the pressure points, which can cause injury as well as great pain. Snap around choke collars have been used to fit around the neck, but, again, these do not control the muzzle and can produce injury to the trachea and/or larynx. There are traditional muzzles to encase the nose and lower jaw of a dog but they do not apply any variable pressure and merely keep the mouth from being opened sufficiently to prevent dogs from biting people. Muzzles are not helpful for obedience training. Various halters also have been advanced for dog control, but they generally do not change in size or shape to aid the handler in applying variable pressure to nerves and muscles which aid in controlling or obtaining obedience from the dog.

The prior art includes a device called a "K-9 Kumalong Halter". This device is shown in U.S. Pat. No. 4,483,275, issued Nov. 20, 1984 to Alice A. De Groot. The halter has an integral leash on a muzzle loop as shown in FIG. 1 of the patent which will tend to tighten upon pulling on the leash, but the way the device is constructed the neck band does not apply appropriate pressure to the sensitive areas of the neck that achieve dog control and obedience without injuring the dog. An intermediate strap is used between a neck band or collar and the muzzle loop and leash, and thus control pressures are not directly applied to the neck upon modest pulling forces on the leash in the proper direction.

The device shown in the parent Application identified above overcomes the problems of other prior art devices and achieves obedient and companionable behavior by having a collar loop and muzzle loop which simultaneously provide pressure on the back and sides of the neck and to the front of the muzzle. The present invention includes improvements to increase adaptability in use.

SUMMARY OF THE INVENTION

The present invention relates to a combination collar and muzzle that achieves obedient and companionable behavior of dogs as well as other animals by providing two loops (a collar loop and a muzzle loop) which will be simultaneously tightened down onto the back and sides of the neck and onto the front of the muzzle through a slip connection that provides direct control of variable pressure through a leash held by the animal handler. The two loops under and near the rear of the lower jaw, are slidably connected through a provided ring so that direct pressure is applied from the leash directly to the muzzle loop against the front of the muzzle, and at the same time the positioning of the collar or neck loop insures that direct pressure is simultaneously applied to the dog's neck, immediately behind its ears, to obtain control and obedience.

The muzzle loop is adjustable and in addition, there is a removable and adjustable connection strap between the muzzle loop and collar that rests on the face of the dog.

The strap joining the muzzle loop and collar is especially useful for short muzzled dogs to prevent the muzzle loop from slipping off. With long muzzled dogs the use of the strap between the collar and muzzle loops prevents the muzzle loop from being pawed off.

The muzzle loop and collar loop preferably are made of materials that do not injure the skin, and the unit is quickly and easily applied and provides for a detachable leash so that the dog can be permitted to run free for obedience exercises, and immediately be recontrolled by attaching the leash and operating the collar and muzzle.

DETAILED DESCRIPTION OF THE PREFERRED EMBODIMENTS

Figure 1:
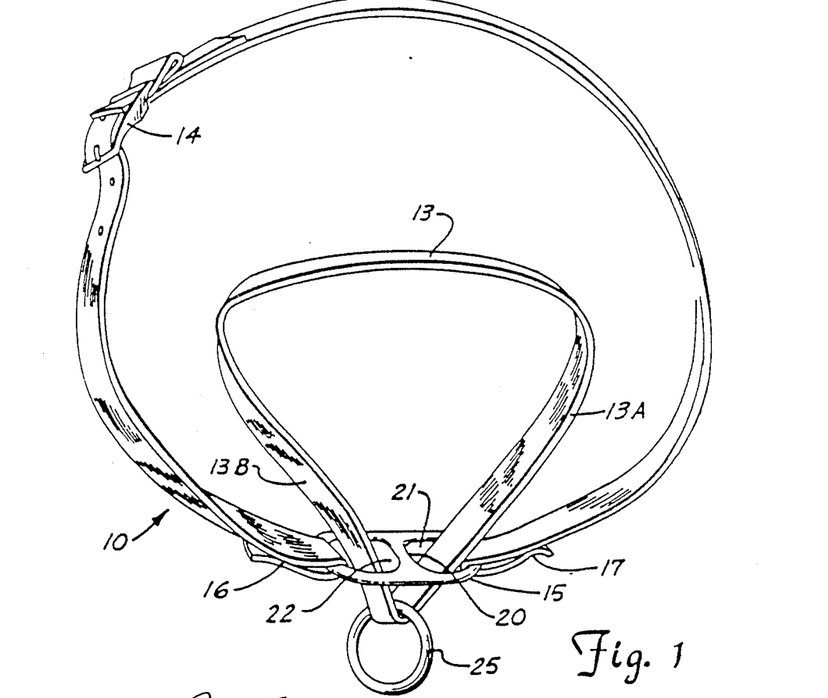
FIG. 1 is a front perspective view of a combination collar and muzzle training aid illustrating individual parts.
Figure 2:
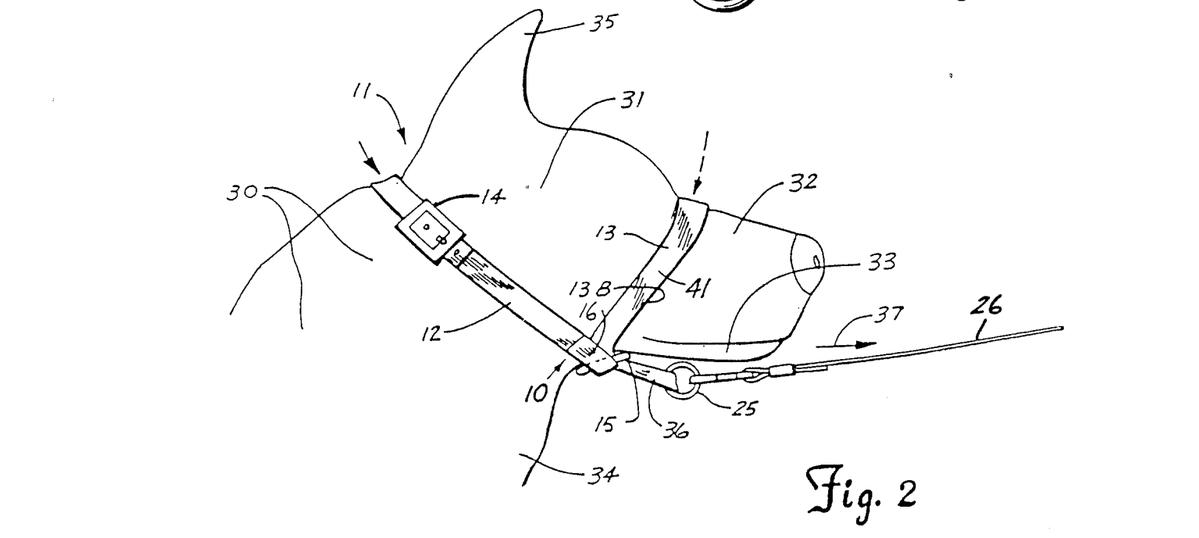
FIG. 2 is a side view of the combination collar and muzzle training aid of FIG. 1 shown on the head view of a dog.

As shown in FIGS. 1 and 2, a combination collar and muzzle training aid is illustrated generally at 10, and in FIG. 2 it is mounted onto the head and neck of a dog indicated at 11. The combination collar and muzzle training aid includes a collar or neck loop 12 and a muzzle loop 13. An adjustable fastener 14 such as a buckle) is used with the collar loop, so that the size of the collar loop can be adjusted to snugly fit the neck of the dog. A connecting ring indicated generally at 15 is attached to the collar loop. As shown, the connecting ring 15 is integrally fastened to and forms part of the collar loop. The ring 15 is connected to ends of sections of the flexible collar band as shown at 16 and 17, on opposite sides of the ring 15. The ring 15 is an oval ring that has a central divider bar 20 to form two side openings 21 and 22. The two lengths indicated at 13A and 13B of the muzzle loop 13 pass through the openings 21 and 22 on opposite sides of the central bar 20, respectively, and the lengths of the muzzle loop are freely slidable in the two side openings of ring 15. A snap receiving ring shown at 25 is also slidably mounted on the muzzle loop 13, below ring 15 for attachment of a leash 26 shown in FIG. 2. The ring 25 slides freely for self adjustment when the leash is pulled.

The dog 11, as shown, has a neck 30, a head 31, a muzzle 32, a lower jaw 33, and a throat 34.

In installation, the collar loop 12 is placed around the neck 30 of the dog and adjusted with the buckle or adjustable fastener 14. Preferably the collar loop and the muzzle loop are made of a strong Nylon web material, but can be made of other flexible materials that can be adjusted in length. The collar loop 12 is made to fit snugly around the throat, but not sufficiently tight to cause choking. The collar loop is placed just behind the ears 35 of the dog and extends behind the head and jaw. The ring 15, as can be seen is under the neck at the rear end of the dog's lower jaw. In FIG. 2 the leash is under tension and the collar loop and muzzle loop are tightened down.

On a dog, as shown in FIG. 2, there is a natural recess between the neck and the rear of the lower jaw for positioning of the collar loop 12. The muzzle loop 13 is looped over the muzzle 32 of the dog. The lower portion of the muzzle loop indicated at 36, which extends below the ring 15, has the leash ring 25 attached thereto and the side lengths 13A and 13B (13B is shown in FIG. 2) are freely slidably passed through the openings 21 and 22. As can be seen in FIG. 2 as soon as pressure is applied to the lower portion 36 of the muzzle loop by pulling on the leash, for example, forwardly as shown by arrow 37, the muzzle loop will exert a force against the upper surfaces of the muzzle, and ring 15 will move against the lower jaw. When forces are applied in the direction shown in FIG. 2 generally along the leash there will also be a simultaneous force created by the sliding of the collar loop 12 against the neck on the upper portions of the neck as the ring 15 is pulled by the leash. There thus is pressure on the two most important animal control pressure points, namely the muzzle and the top of the neck immediately behind the ears where nerves and muscles are located.

One of the features is that the pressure to the muscles and nerves takes advantage of the generally accepted theory that comes from research on horses (which provides indirect evidence of similar neurophysiologic effects in dogs) that the pressure on the nerves and tissues causes release of neurotransmitters which appear to have a paliative or calming effect. The calming effect aids in humane control without injury to tissues, nerves or organs of the animal when properly applied.

The collar has a very simple geometric form as shown in FIG. 1, such as a "FIG. 8" when the two loops are laid out. The loops are slidably joined in the center and with the muzzle loop freely slidable in the connecting ring 15 held by the collar loop. By the application of pressure on the leash in substantially any direction, pressure is simultaneously applied in areas that provide effective control, which from indirect evidence is believed to be related to neurophysiologic action and the release of paliative and calming neurotransmitters.

Figure 3:
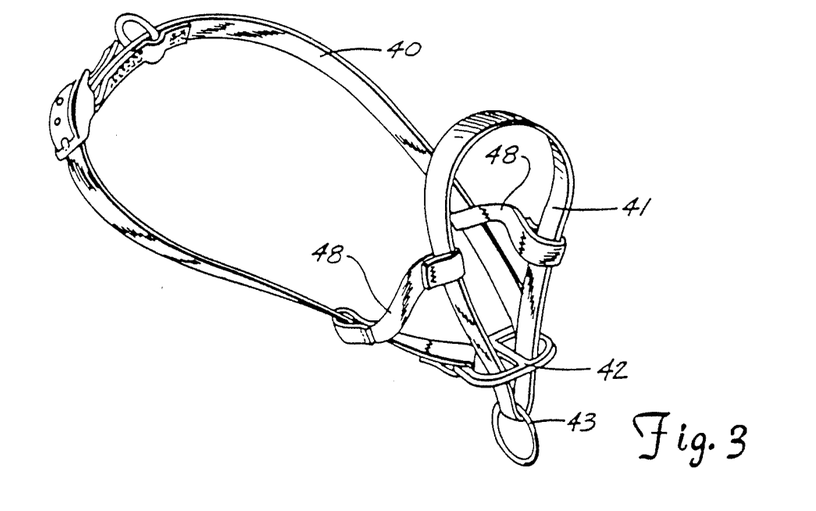
FIG. 3 is a layout of a second form of the combination collar and muzzle.
Figure 4:
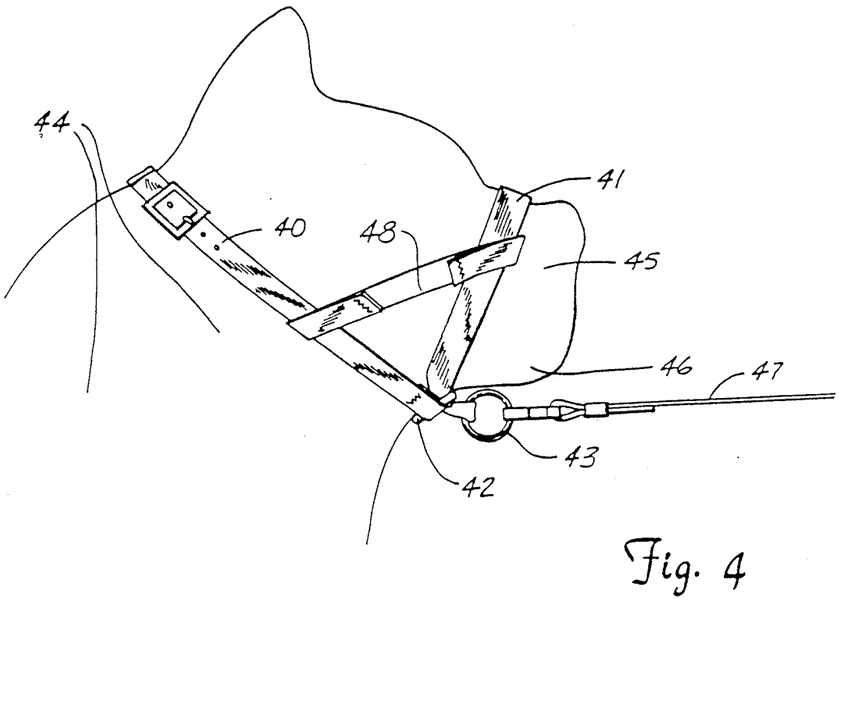
FIG. 4 is a side view of the second form of the combination collar and muzzle of the present invention shown being worn by a short muzzled dog.

In FIGS. 3 and 4, a modified form of the invention is shown. The modified device has a collar loop 40, a muzzle loop 41, a center bar, oval ring 42, and a leash ring 43 that are coupled together in the same manner as previously explained. In other words, pulling on the leash 47 simultaneosuly applies pressure to the neck 44 of an animal, in this case a dog with a short muzzle. The muzzle 45 of this dog is quite short, and there is a chance that a loop, such as loop 41, might slip off the lower jaw indicated at 46 (or be moved by a dog pawing it off), so slidable stabilizer straps 48 are provided joining the collar loop and the muzzle loop along the sides of the dog's head. The stabilizers 48 comprise straps on opposite sides of the dog's head made of the same material as the collar loop and muzzle loop. Each stabilizer strap 48 has loops at its ends which slidably receive the collar loop at one end and the muzzle loop at the other end.

The same action previously described is achieved with the training aid of FIGS. 3 and 4. There is no impediment to the tightening action from the stabilizer straps 48 which are slidable at each end between the collar loop and the muzzle loop. The straps 48 do prevent the muzzle loop from sliding off the muzzle 45 of the short muzzle dog shown.

The pulling of the leash 47 again will simultaneously apply pressure, both to the muzzle of the dog and to the neck of the dog immediately behind the ears to provide the control pressures that will bring about obedience and satisfactory behavior in the animal.

The collar loop shown in FIG. 4 is adjusted so that it snugly fits the neck of the dog, but does not apply pressure that will injure the trachea, larynx, or the skin.

The adjustable stabilizers 48 may be semi-rigid or flexible as desired, and will prevent a dog that tries to remove the muzzle loop with its paws from doing so, as well as being desirable for the short muzzle dog shown.

Figure 5:
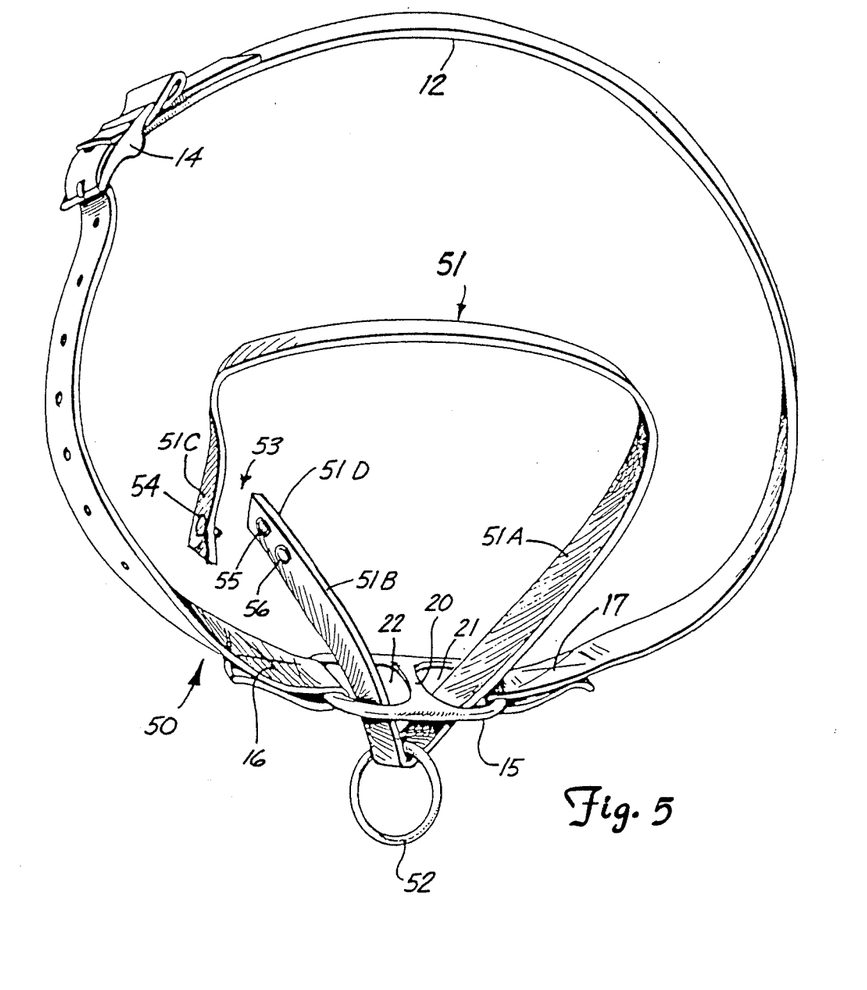
FIG. 5 is a front perspective of a third form of the combination collar and muzzle of the present invention.

In FIG. 5, the form of the improved version of the present invention is shown generally at 50, and includes collar loop 12 that is constructed as shown in FIGS. 1 and 2, including the adjustable fastener 14, and the connecting ring 15. The ring 15 is connected to the ends of the sections of the flexible collar loop 12 as shown at 16 and 17 on opposite ends of the ring 15. The ring 15 is an oval ring that has a center divider bar 20 to form two side openings 21 and 22.

In this form of the invention, a modified muzzle loop 51 is provided, and has two lengths 51A and 51B that extend through the openings 21 and 22 on opposite sides of the center bar 20, respectively, and the lengths of 51A and 51B are freely slidable in these openings. The muzzle loop thus has the two loop portions, one around the muzzle and the other below ring 15. A snap receiving ring 52 is provided on the muzzle loop below the ring 15, as shown, for attachment of a leash. The ring 52 slides freely for self-adjustment and tightening when the leash is pulled.

The muzzle loop 51, however, is split as at 53, and in use is held closed with adjustable fastener means, as shown, snap fasteners. The fasteners include a first snap fastener 54 mounted onto a first end portion 51C of loop 51 that forms part of the side length 51B, and second snap portions 55 and 56, which provide for adjustment of the total length of the muzzle loop, and the second snap fastener portions 55 and 56 are mounted on an end portion 51D of the muzzle loop 51. This end portion 51D forms a part of the side length 51B when the snap fasteners are snapped in place over the muzzle of a dog that is wearing the training aid.

The adjustment of snap fasteners, of course, can be made to accomodate a wide range of muzzle sizes. The muzzle loop can be adjusted to change the length so the muzzle can be made to fit an animal properly, as well.

Figure 6:
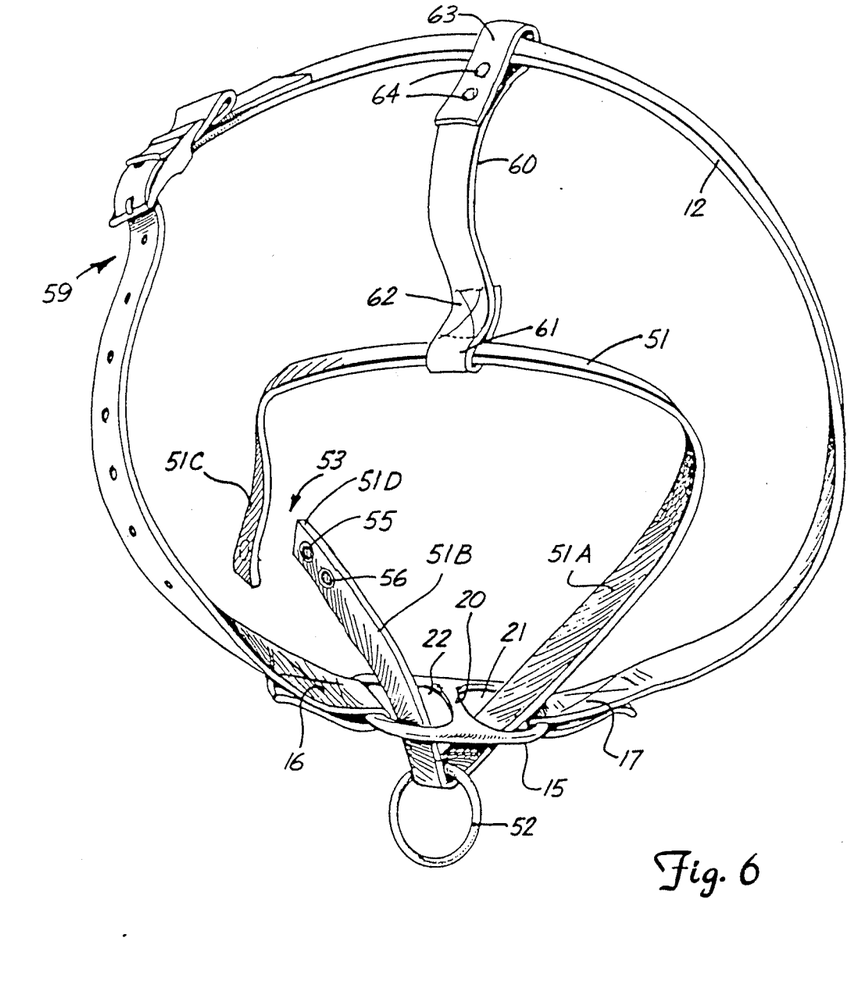
FIG. 6 is a perspective of a fourth form of the combination collar and muzzle training aid of the present invention.

FIG. 6 shows a further modified form of the invention, which includes a collar loop 12, as previously explained, and the muzzle loop 51 having two loop portions, one for placing around the muzzle and the other below ring 15 so the upper loop section can be tightened onto the muzzle as previously explained, with the snap fastener means 54, 55 and 56 in place on the side lengths 51B. All of the parts that are identical to those shown in FIG. 5 are like numbered in FIG. 6, and will not be further explained.

It has been found, however, that on short-muzzled dogs as shown in FIGS. 3 and 4, and even on long-muzzled dogs, where the training aid is left in place on the dog for a long period of time (not just during training exercises and the like) an improved, centered keeper strap shown at 60 will prevent the muzzle loop from being pawed off, or just falling off from the muzzle of a short-muzzled dog. The centered keeper strap provides retention as do the side straps shown in FIGS. 3 and 4.

It is to be remembered that in use the muzzle loop is not held tight at all times, and will be permitted to loosen around the muzzle to permit the dog to pant and eat, and at such times the muzzle loop may tend to fall off over the nose of a short-muzzled dog such as a Boston terrier or bulldog, in particular. Likewise, since the muzzle loop can be loosened, the dog may try to paw off the muzzle loop during periods of relaxation and even long-muzzled dogs can give problems with pawing off the loosened muzzle loop.

The keeper strap 60 comprises a strap member that has one closed end loop formed as shown at 61 that surrounds the upper part of the muzzle loop 51, and can be sewed in place or fastened as shown at 62. The fastening at 62 can be a hook and loop fastener sold under the trademark "Velcro" or snap fasteners if desired so that the keeper strap 60 can be removed.

Additionally, the other end of the keeper strap 60 forms a loop 63 that encircles the collar loop 12 at a location that is between the ears of a dog wearing the loop. Fastener means shown at 64 are used to permit adjustment of the length of the keeper strap 60 to accomodate dogs having different lengths of muzzles.

The fastener means 64 as shown have two separate snap fastener portions on one part of the loop, and a mating fastener snap portion (not shown) is positioned on the main part of the keeper strap 60. One or other portions of the snap fastener means 64 are fastened to adjust the length properly.

Also, suitable fasteners such as hook and loop fasteners sold under the trademark "Velcro" can be used for holding the loop 63 in place. The loop 60 can slide along the collar loop 12 to ensure that the keeper strap 60 is kept in place centered on the muzzle and between the ears of a dog wearing the training aid.

Figure 7:
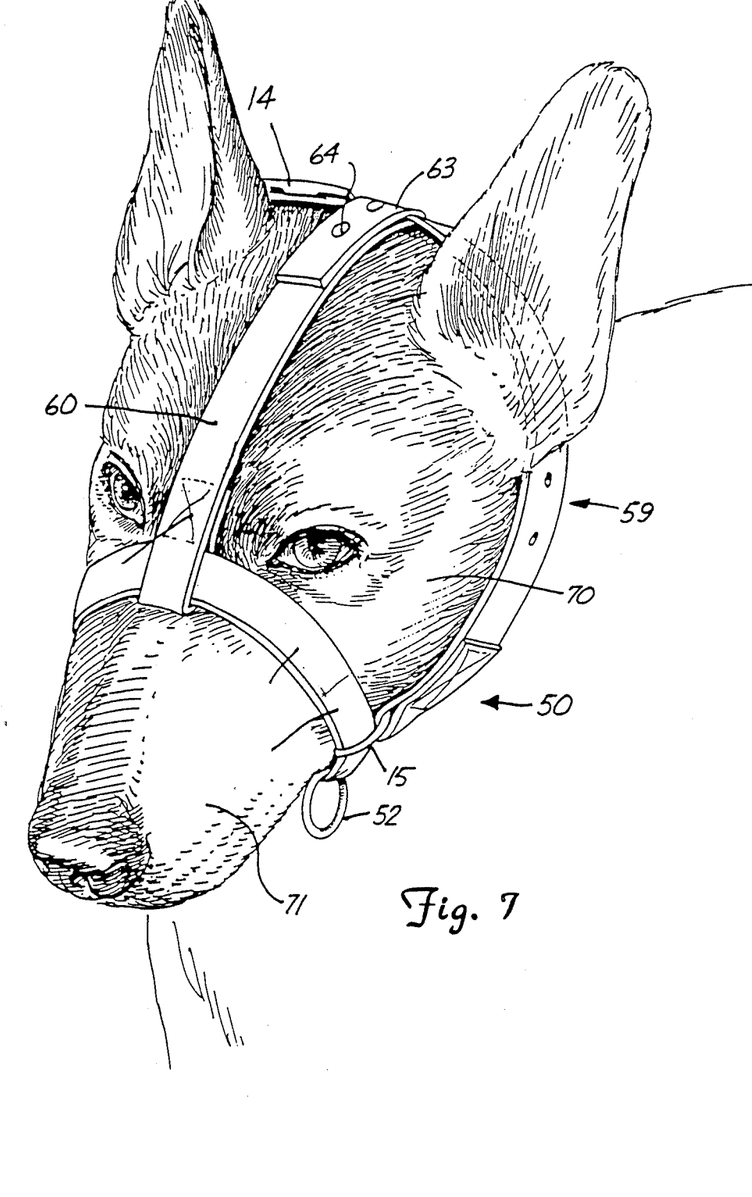
FIG. 7 is a front perspective view of the device of FIG. 6 on a long muzzled dog.

In FIG. 7, the device shown in FIG. 6 is mounted onto the head of a dog indicated generally at 70. In this case, the dog has a long muzzle indicated at 71. The muzzle loop 51 is in place around the dog's muzzle, and it can be seen that the ring 15 is positioned underneath the dog's jaw with the muzzle loop adjusted so the ring 52 is right below the jaw. The muzzle loop can be adjusted using the snap fasteners 54, 55 and 56 which are shown in FIG. 6. The keeper strap 60 also is made so the fasteners shown at 64 forming the loop 63 provides a proper length to hold the muzzle loop 51 in position.

With the keeper strap 60 in place, the muzzle loop cannot easily be pawed off by the dog, because the keeper strap is of proper length to transfer load to the collar loop to retain the muzzle loop on the dog. The muzzle loop thus is kept in proper position for accomplishing the purposes of providing the necessary pressure for calming and controlling in a humane manner.

Figure 8:
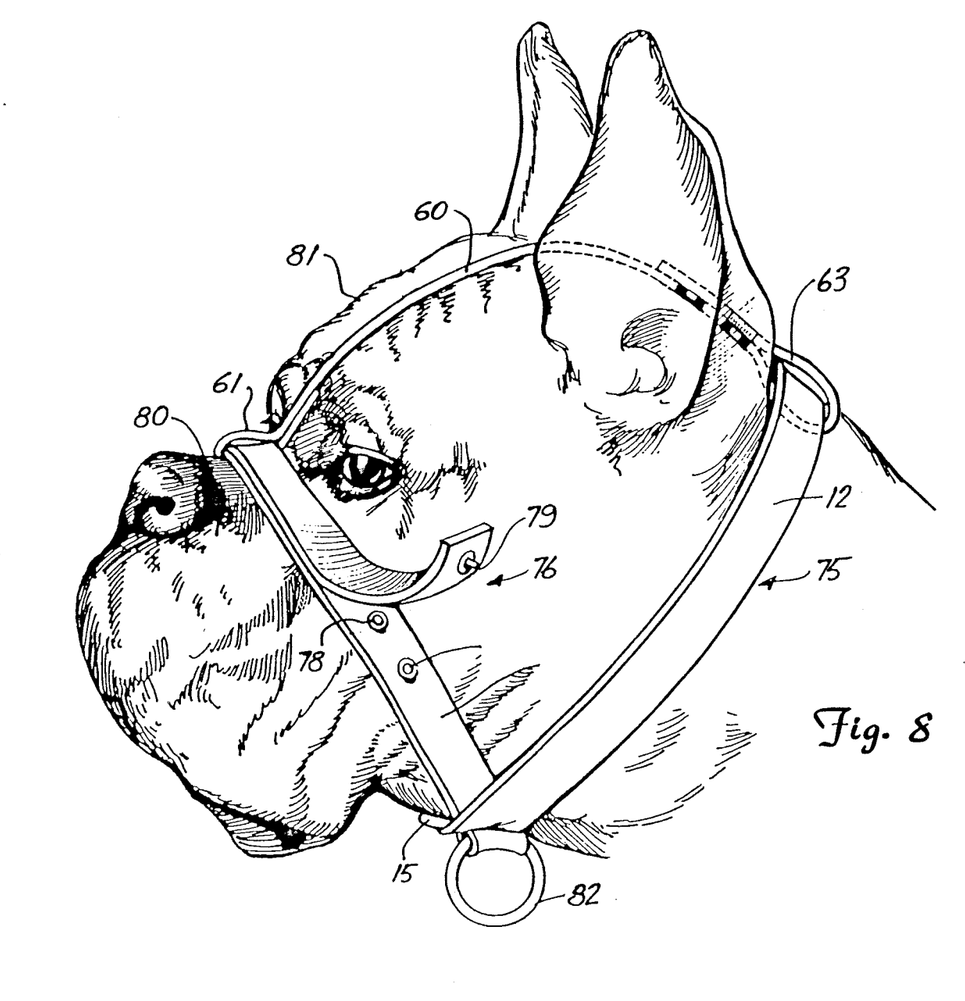
FIG. 8 is a perspective view of the head of a short muzzled dog having a combination collar and muzzle training aid made similarly to the form of the present invention shown in FIG. 6 installed thereon.

FIG. 8 illustrates a training aid similar to the training aid 59 in position on a short-muzzled dog. In this instance, the training aid indicated at 75 includes a collar loop 12 as previously explained, but the muzzle loop indicated at 76 is made so that it folds across the muzzle and has a split 76 that is held closed with suitable fastener portions 77 and 78 and with a second fastener section 79 that permits adjustment of the muzzle loop 76 to fit the short muzzle indicated at 80 of a dog 81.

The training aid 75 includes a keeper strap 60 that has a loop 63 circled around the collar loop 12, and the loop 61 that encircles the muzzle loop 76.

A ring 82 is positioned on the muzzle loop below the ring 15 on the collar loop 12, and the ring 82 can be connected to a leash to provide the calming pressures on the neck and muzzle of the dog by pulling forwardly and slightly upwardly, as previously explained.

The keeper strap 60 holds the muzzle loop in position on the short muzzle 80 of the dog 81 so that the muzzle loop will not fall off even when pressure is released and the muzzle loop is loosened. The owner is sure that the training aid is retained in position through the use of the adjustable muzzle loop and the keeper strap 60 as an assembly. The muzzle loop slides through the ring 15 in the same manner as explained in relation to FIGS. 1 and 2, and thus permits applying adequate pressure to the neck and muzzle of the animal.

The humane aspects of the present training aid have been demonstrated in use, and the advantages of the recognized neurophysiologic action, as well as the anatomic action on the neck provide for adequate control. Neurotransmitters to the brain are affected, as shown by indirect evidence with other animals, for calming and control in a humane manner.

Thus, in summary, the device of the present invention in all its forms provides direct control of variable pressure that is applied simultaneously to the back and sides of the neck and the upper and lower jaws, without applying choking pressure to the sensitive areas under the neck, such as the trachea and larynx, when the leash is tightened. The muzzle loop is of size to permit the dog to pant when the muzzle loop is loose, but the muzzle loop can quickly be tightened to prevent a dog from biting when leash pressure is applied. The simultaneous pressure applied to the collar and the muzzle insures that the dog's jaws can be kept tightly closed if desired. The training aid provides more humane, but precise and effective restraint to aid control and achieve obedient behavior of any dog, regardless of size, temperament or behavior. When a handler pulls appropriately on the leash, pressure is provided to the desired area of muscles and nerves at the back of the neck, immediately behind the ears, and to the sides of the neck and is actively controlled to give a neurophysiologic action as explained, tending to provide calming neurotransmitters to the brain for control. The action is not mechanical as with other collars. The pressure to these anatomical areas of the neck behind the ears is easily controlled and there is no excessive force required to tend to injure the skin or organs of the dog. The keeper straps insure retaining the muzzle loop on the dog's muzzle. The adjustable muzzle loop provides a fit for dogs of different sizes.

The humane control is provided precisely and effectively by the amount of pressure applied by pulling the leash in any direction to achieve obedient behavior of any dog, large or small and regardless of temperament, that is, whether or not the dog is vicious, rambunctious, boisterous, assertive, reluctant or fearful.

Many kinds of materials, such as leather, as well as nylon strapping, plastic, flexible metal and other suitable materials can be utilized for the figure eight design of the combination collar and muzzle loop and for the keeper straps.

Although the present invention has been described with reference to preferred embodiments, workers skilled in the art will recognize that changes may be made in form and detail without departing from the spirit and scope of the invention.

What is claimed is:

1. A combination collar and muzzle humane training aid for dogs having a head with a muzzle, a neck and ears, said humane training aid comprising:
   an adjustable collar adapted to fit closely around the neck of a dog on which the humane training aid is placed on an upper side of the neck immediately behind the ears of such dog and extending closely behind the head along lateral sides of the neck to a lower side of the neck;
   a ring carried by said collar, said collar being fitted to position the ring against the lower side of the neck immediately to the rear of the lower jaw of a dog on which the collar is fitted; and
   a muzzle loop freely slidably passing through said ring and forming a substantially continuous loop over the muzzle of a dog on which the humane training aid is placed and having a portion extending out of said ring for attachment to a leash, the ring being held by the collar so that when the muzzle loop is pulled pressure is applied downwardly on the muzzle by the loop sliding through the ring and by the collar bearing on the upper side and lateral sides of the neck of a dog wearing the humane training aid.

2. The combination collar and muzzle humane training aid for dogs as specified in claim 1 wherein said ring is a continuous ring, and said collar is fastened to opposite end portions of said ring, said muzzle loop passing freely between the opposite end portions for free sliding movement, and said muzzle loop having a sufficient peripheral length so that when pressure on the muzzle loop as applied to the portion extending out of the ring is relaxed, the muzzle loop will permit a dog wearing the humane training aid to open its jaws.

3. The apparatus as specified in claim 1 wherein the collar is adjustable for fitting and adjusted so that the ring is on the lower side of the neck at the rear of the dog's lower jaw, and wherein the muzzle loop extends upwardly and forwardly therefrom when the humane training aid is on a dog and whereby upon a pulling movement on the portion of the muzzle loop extending out of the ring in a direction generally along the lower side of the jaw of a dog wearing the humane training aid and in a forwardly direction, the ring is moved in direction against the lower jaw and forwardly, and the collar will simultaneously provide a pressure on the upper side of the neck while the muzzle loop exerts a force against upper surfaces of a muzzle of a dog wearing the humane training aid.

4. The humane training aid of claim 1 wherein said means for attaching a leash comprises a second ring freely slidably mounted on the portion of the loop extending outwardly from the first mentioned ring.

5. A combination collar and muzzle humane training aid for animals having a head with a muzzle, a neck and ears, said humane training aid comprising:
   an adjustable collar adapted to fit closely around and over the neck of an animal immediately behind the ears of such animal and extending from a top of the neck closely behind the head along lateral sides of the neck to a lower side of the neck of such animal;
   a ring carried by said collar and said collar being fitted to position the ring against the lower side of the neck immediately to the rear of the lower jaw of an animal on which the collar is fitted; and
   a muzzle loop freely slidably passing through said ring and forming a substantially continuous loop over the muzzle of an animal on which the humane training aid is placed and having a portion extending out of said ring for attachment to a leash, the ring being held by the collar so that when the muzzle loop is pulled forwardly, pressure is applied downwardly on the muzzle by the muzzle loop sliding through the ring and by the collar on the top and lateral sides of the neck of a dog wearing the humane training aid, the fitting of the collar keeping the collar positioned along the lateral sides of the neck and to the rear of the jaw of an animal on which the humane training aid is placed as pressure is applied to the muzzle loop.

6. A combination collar and muzzle humane training aid for dogs having a head, eyes, a muzzle extending forwardly from the eyes, said humane training aid comprising:
   an adjustable collar adapted to fit closely around a neck of a dog on which the humane training aid is placed, immediately behind the ears of such dog and being positionable to extend closely behind the head to a throat side of the neck;
   a ring carried by said collar, said collar being adjustable to position the ring against the throat side of the neck immediately to the rear of a lower jaw of a dog on which the collar is fitted; and
   a muzzle loop freely slidably passing through said ring and forming a loop over the muzzle and immediately adjacent and forwardly of the eyes of a dog on which the humane training aid is placed, the muzzle loop being guided by the ring and collar to remain positioned immediately forwardly of the eyes of such dog, said muzzle loop having a portion extending out of said ring for attachment to a leash, the ring being held by the collar so that when the muzzle loop portion extending out of the ring is pulled, pressure is applied downwardly on the muzzle by the loop sliding through the ring and lateral pressure is also applied by the collar onto upper and lateral side surfaces of the neck of a dog wearing the humane training aid.

7. The combination collar and muzzle humane training aid for dogs as specified in claim 6 wherein said ring is a continuous ring, and said collar has portions fastened independently to said ring at spaced locations, said muzzle loop passing freely through the ring between end portions of the collar for free sliding movement.

8. A humane training aid for dogs having a head with a muzzle, a neck and ears for use in combination with a collar adapted to fit closely around the neck of a dog on which the humane training aid is placed and across an upper side of the neck immediately behind the ears of such dog and extending closely behind the head along lateral sides of the neck to a lower side of the neck, the improvement comprising: a muzzle loop, a slide ring supported by such collar, said collar being fitted to position the slide ring at the lower side of the neck immediately to the rear of the lower jaw of a dog on which the collar is fitted, the muzzle loop freely slidably passing through said slide ring and forming a substantially continuous loop over the muzzle of a dog on which the humane training aid is placed and having a portion extending out of said slide ring for attachment to a leash, the slide ring being supported by the collar so that when the muzzle loop is pulled pressure is applied downwardly on the muzzle by the loop sliding through the slide ring and applying pressure to the collar so the collar substantially simultaneously bears on the upper side and lateral sides of the neck of a dog wearing the humane training aid.

* * * * *